US009402029B2

(12) United States Patent  
Ishihara (10) Patent No.: US 9,402,029 B2  
(45) Date of Patent: Jul. 26, 2016

(54) IMAGE PROCESSING APPARATUS CAPABLE OF SPECIFYING POSITIONS ON SCREEN (71) Applicant: CASIO COMPUTER CO., LTD., Shibuya-ku, Tokyo (JP)

(72) Inventor: Masanori Ishihara, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 13/794,722

(22) Filed: Mar. 11, 2013

(65) Prior Publication Data  
US 2013/0242160 A1 Sep. 19, 2013

(30) Foreign Application Priority Data  
Mar. 14, 2012 (JP) ................................ 2012-056888

(51) Int. Cl.  
*H04N 5/222* (2006.01)  
*G06K 9/42* (2006.01)  
*H04N 5/232* (2006.01)  
*H04N 5/262* (2006.01)

(52) U.S. Cl.  
CPC ......... *H04N 5/23293* (2013.01); *H04N 5/2621* (2013.01)

(58) Field of Classification Search  
CPC ... G06T 11/60; H04N 5/23293; H04N 5/2621  
See application file for complete search history.

(56) References Cited

U.S. PATENT DOCUMENTS

| 7,391,929 B2 | 6/2008 | Edwards et al. |
| 7,587,100 B2 | 9/2009 | Edwards et al. |
| 7,961,978 B2 | 6/2011 | Edwards et al. |
| 8,254,722 B2 | 8/2012 | Edwards et al. |

(Continued)

FOREIGN PATENT DOCUMENTS

| JP | 07044719 A | 2/1995 |
| JP | 09319884 A | 12/1997 |

(Continued)

OTHER PUBLICATIONS

Japanese Office Action dated Oct. 22, 2013 (and English translation thereof) in counterpart Japanese Application No. 2012-056888.

(Continued)

*Primary Examiner* — Aung S Moe  
*Assistant Examiner* — John H Morehead, III  
(74) *Attorney, Agent, or Firm* — Holtz, Holtz & Volek PC (57) ABSTRACT

Disclosed is an image processing apparatus including: an obtaining unit which obtains an image; a first display control unit which displays the image on a display region of a display unit, the image being obtained by the obtaining unit; a rendering unit which performs rendering in the image based on an operation for an operation unit by a user, the image being displayed on the display region by the first display control unit; a specifying unit which specifies a first region closed by a boundary line rendered by the rendering unit; and a second display control unit which displays, on the display region, at least either one of an image of the first region specified by the specifying unit and an image of a second region other than the first region in the obtained image in a display mode capable of discriminating the at least either one image.

13 Claims, 5 Drawing Sheets

(56) References Cited

U.S. PATENT DOCUMENTS

| | | | |
|---|---|---|---|
| 8,665,258 B2* | 3/2014 | Diverdi | G06T 15/205 345/419 |
| 2007/0127043 A1* | 6/2007 | Maekawa | H04N 1/642 358/1.9 |
| 2007/0216675 A1* | 9/2007 | Sun | G06T 11/00 345/419 |
| 2008/0077953 A1* | 3/2008 | Fernandez | H04N 7/15 725/32 |
| 2008/0094411 A1* | 4/2008 | Parenteau | G06T 15/503 345/592 |
| 2008/0095429 A1* | 4/2008 | Wilensky | G06K 9/342 382/164 |
| 2010/0080448 A1* | 4/2010 | Tam | G06T 7/0051 382/154 |
| 2010/0169777 A1* | 7/2010 | Weber | G06F 17/30244 715/716 |
| 2011/0150321 A1* | 6/2011 | Cheong | G06T 11/60 382/154 |
| 2012/0020554 A1* | 1/2012 | Sun | G06T 7/0081 382/164 |
| 2012/0023456 A1* | 1/2012 | Sun | G06T 7/0081 715/863 |
| 2012/0069007 A1* | 3/2012 | Pegg | G06K 9/00221 345/419 |
| 2012/0287300 A1 | 11/2012 | Edwards et al. | |
| 2013/0301948 A1 | 11/2013 | Edwards et al. | |

FOREIGN PATENT DOCUMENTS

| | | | |
|---|---|---|---|
| JP | 2002152496 A | 5/2002 | |
| JP | 2005-267259 A | 9/2005 | |
| JP | 2006-262041 A | 9/2006 | |
| JP | 2007-011499 A | 1/2007 | |
| JP | 2008-242650 A | 10/2008 | |
| JP | 2009-519622 A | 5/2009 | |

OTHER PUBLICATIONS

Sotechsha; "Photoshop Elements 10 super reference for Windows & Macintosh"; Sotechsha Corporation; Feb. 20, 2012; First Edition; pp. 90-118.

Japanese Office Action dated Jan. 21, 2014 (and English translation thereof) in counterpart Japanese Application No. 2012-056888.

Korean Office Action dated Apr. 30, 2014 in counterpart Korean Application No. 10-2013-0017299.

Cut the part to be composed easily in Photoshop, [online], Dec. 2008, [Searched on Apr. 28, 2014], Internet: <URL: http://smoker3.blog.me/30038918497>.

[Photoshop Quickmask] Cut the desired part clearly, [online], Dec. 2009, [Searched on Apr. 28, 2014], Internet: <URL: http://www.zooftp.com/47>.

Method for using Photoshop quickmask mode, [online], Sep. 2005, [Searched on Apr. 28, 2014], Internet: <URL: http://blog.navercom/x_tough_x/140017225826>.

Select Photoshop-region <1. marquee tool and magic wand tool>, [online], Oct. 2010, [Searched on Apr. 28, 2014], Internet: <URL: http://fromys.blog.me/120116038616>.

Korean Office Action dated Oct. 31, 2014, issued in counterpart Korean Application No. 10-2013-0017299.

Korean Office Action (and English translation thereof) dated Mar. 23, 2015, issued in counterpart Korean Application No. 10-2015-0016766.

Korean Office Action (and English translation thereof) dated Sep. 25, 2015, issued in counterpart Korean Application No. 10-2015-0016766.

* cited by examiner

IMAGE PROCESSING APPARATUS CAPABLE OF SPECIFYING POSITIONS ON SCREEN

CROSS-REFERENCE TO RELATED APPLICATIONS

This application is based upon and claims the benefit of priority from the prior Japanese Patent Application No. 2012-056888, filed on Mar. 14, 2012, the entire contents of which are incorporated herein by reference.

BACKGROUND OF THE INVENTION

1. Field of the Invention

The present invention relates to an image processing apparatus, an image processing method and a recording medium.

2. Description of Related Art

Heretofore, as disclosed in Japanese Patent Laid-Open Publication No. 2006-262041, there has been known a technology for designating a region with an arbitrary shape in an image by performing an operation of moving a finger on a touch panel, and for performing a variety of processing for such an image in the designated region. Moreover, a technology for displaying an orbit thus traced has also been known.

SUMMARY OF THE INVENTION

An image processing apparatus according to one aspect of the present invention includes:

an obtaining unit which obtains an image;

a first display control unit which displays the image on a display region of a display unit, the image being obtained by the obtaining unit;

a rendering unit which performs rendering in the image based on an operation for an operation unit by a user, the image being displayed on the display region by the first display control unit;

a specifying unit which specifies a first region closed by a boundary line rendered by the rendering unit; and a second display control unit which displays, on the display region, at least either one of an image of the first region specified by the specifying unit and an image of a second region other than the first region in the obtained image in a display mode capable of discriminating the at least either one image.

A processing method using an image processing apparatus according to another aspect of the present invention includes the steps of:

obtaining an image;

displaying the obtained image on a display region of a display unit;

performing rendering in the image based on an operation for operation unit by a user, the image being displayed on the display region;

specifying a first region closed by a rendered boundary line; and displaying, on the display region, at least either one of a specified image of the first region and an image of a second region other than the first region in the obtained image in a display mode capable of discriminating the at least either one image.

According to still another aspect of the present invention, a computer readable storing medium which stores a program which makes a computer of an image processing apparatus realize:

an obtaining function which obtains an image;

a first display control function which displays the image on a display region of a display unit, the image being obtained by the obtaining function;

a rendering function which performs rendering in the image based on an operation for an operation unit by a user, the image being displayed on the display region by the first display control function;

a specifying function which specifies a first region closed by a boundary line rendered by the rendering function; and a second display control function which displays, on the display region, at least either one of an image of the first region specified by the specifying function and an image of a second region other than the first region in the obtained image in a display mode capable of discriminating the at least either one image.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENT

A description is made below of specific aspects of the present invention by using the drawings. However, the scope of the invention is not limited to the illustrated examples.

Figure 1:
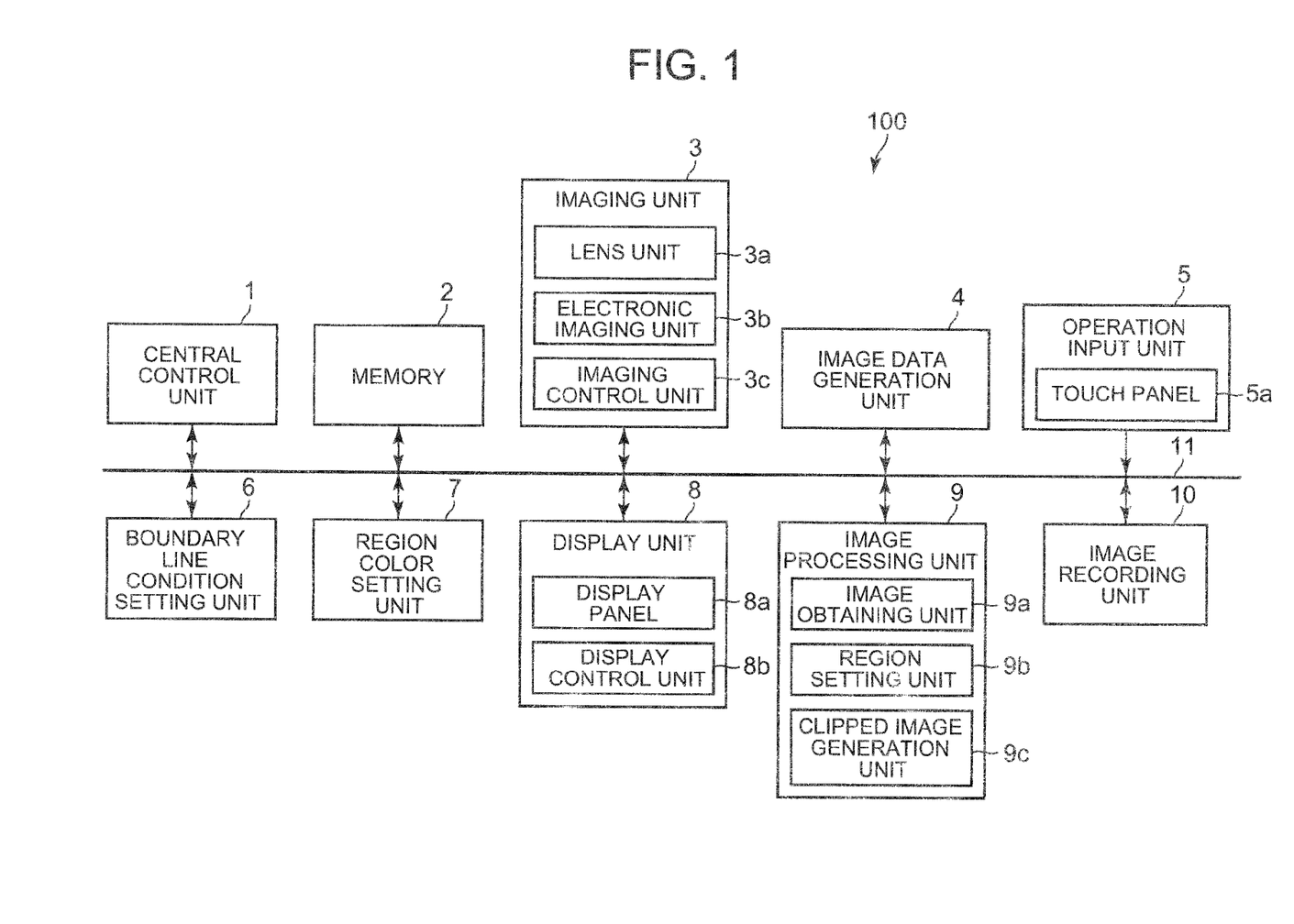
FIG. 1 is a block diagram showing a schematic configuration of an imaging apparatus of an embodiment to which the present invention is applied.

FIG. 1 is a block diagram showing a schematic configuration of an imaging apparatus 100 of an embodiment to which the present invention is applied.

As shown in FIG. 1, the imaging apparatus 100 of this embodiment includes: a central control unit 1; a memory 2; an imaging unit 3; an image data generation unit 4; an operation input unit 5; a boundary line condition setting unit 6; a region color setting unit 7; a display unit 8; an image processing unit 9; and an image recording unit 10.

Moreover, the central control unit 1, the memory 2, the imaging unit 3, the image data generation unit 4, the operation input unit 5, the boundary line condition setting unit 6, the region color setting unit 7, the display unit 8, the image processing unit 9 and the image recording unit 10 are connected to one another through a bus line 11.

The central control unit 1 is a unit that controls the respective units of the imaging apparatus 100. Specifically, though not shown, the central control unit 1 includes a CPU (Central Processing Unit), a RAM (Random Access Memory), and a ROM (Read Only Memory), and performs a variety of control operations in accordance with a variety of processing programs (not shown) for the imaging apparatus 100.

The memory 2 is composed, for example, of a DRAM (Dynamic Random Access Memory) and the like, and is a memory that temporarily stores data and the like, which are to be processed by the respective units such as the central control unit 1 and the image processing unit 9.

The imaging unit 3 images a subject (for example, a soccer ball and the like) present in a background. Specifically, the imaging unit 3 includes a lens unit 3a, an electronic imaging unit 3b, and an imaging control unit 3c.

The lens unit 3a is composed, for example, of a plurality of lenses such as a zoom lens and a focus lens.

The electronic imaging unit 3b is composed, for example, of an image sensor such as a COD (Charge Coupled Device) and a CMOS (Complementary Metal-oxide Semiconductor), and converts an optical image, which has passed through a variety of the lenses of the lens unit 3a, into a two-dimensional image signal.

Note that, though not shown, the imaging unit 3 may include a diaphragm that adjusts a quantity of light that passes through the lens unit 3a.

The imaging control unit 3c controls the imaging of the subject by the imaging unit 3. That is to say, though not shown, the imaging control unit 3c includes a timing generator, a driver and the like. Then, the imaging control unit 3c scans and drives the electronic imaging unit 3b by the timing generator and the driver, and converts the optical image into the two-dimensional image signal by the electronic imaging unit 3b in every predetermined cycle. Then, the imaging control unit 3c reads out frame images from an imaging region of the electronic imaging unit 3b by every amount of one screen, and outputs the readout frame images to the image data generation unit 4.

The image data generation unit 4 generates image data of an original image P1 (refer to FIG. 3) in which the subject is present in the background. Specifically, the image data generation unit 4 appropriately performs gain adjustment for analog-value signals of the frame images, which are transferred thereto from the electronic imaging unit 3b, for each of color components of R, G and B, thereafter, performs sample holding for the signals concerned by a sample hold circuit (not shown), and coverts the signals into digital data by an A/D converter (not shown). Then, the image data generation unit 4 performs color process treatment, which includes pixel interpolation processing and γ-correction processing, for the digital data by a color process circuit (not shown), and thereafter, generates digital-value luminance signals Y and color-difference signals Cb and Cr (YUV data).

The luminance signals Y and the color-difference signals Cb and Cr, which are to be outputted from the color process circuit, are DMA-transferred through a DMA controller (not shown) to the memory 2 for use as a buffer memory.

The operation input unit 5 is a unit for inputting a variety of instructions to a body of the imaging apparatus 100.

Specifically, the operation input unit 5 includes: upper, lower, left and right cursor buttons and a decision button, which are related to selection instructions for a mode, a function and the like; communication-related buttons related to execution instructions for sending/receiving of a telephone call, transmission/reception of electronic mail and the like; and a variety of buttons such as numeric buttons and symbol buttons, which are related to input instructions for text (any of the above is not shown).

Then, when the variety of buttons are operated by a user, the operation input unit 5 outputs operation instructions, which correspond to the operated buttons, to the central control unit 1. The central control unit 1 allows the respective units to perform predetermined operations (for example, imaging of a subject, and the like) in accordance with the operation instructions outputted from the operation input unit 5 and inputted thereby.

Moreover, the operation input unit 5 includes a touch panel 5a provided integrally with a display panel 8a (described later) of the display unit 8.

The touch panel 5a detects contact positions of a finger (hand) of the user, a touch pen and the like, which directly or indirectly contact the display screen that forms a display region of the display panel 8a. That is to say, for example, the touch panel 5a is provided on the display screen or in an inside more than the display screen concerned, and detects XY coordinates of the contact positions on the display screen by a variety of methods such as a resistive film method, an ultrasonic surface elastic wave method, and an electrostatic capacitance method. Then, the touch panel 5a outputs position signals, which are related to the XY coordinates of the contact positions, to the central control unit 1 and the image processing unit 9.

Specifically, for example, when a boundary line L (refer to FIG. 4A) is rendered in the original image P1, which is displayed on the display panel 8a, in accordance with a predetermined operation by the user, the touch panel 5a outputs such position signals related to XY coordinates of contact positions of the boundary line L concerned.

Note that detection accuracy of the contact positions on the display screen by the touch panel 5a is changeable arbitrarily as appropriate, and for example, one pixel may be strictly set as the contact position, or a plurality of pixels within a predetermined range in which one pixel is taken as a center may be set as the contact position. Moreover, such a rendering operation for the boundary line L is performed by using the touch panel 5a; however, this is merely an example, and the rendering operation according to the present invention is not limited to this. The rendering operation may be performed by using other buttons of the operation input unit 5, for example, upper, lower, left and right moving keys and the like, or may be performed by using a device (not shown) for the rendering, which is externally connected to the body of the apparatus.

The boundary line condition setting unit 6 sets a variety of conditions for the boundary line L to be rendered in the original image P1.

That is to say, as first setting unit, the boundary line condition setting unit 6 sets at least either one of a color and thickness of the boundary line L.

Specifically, for example, when a desired color is designated based on the predetermined operation for the operation input unit 5 by the user, the boundary line condition setting unit 6 sets the color concerned as the color of the boundary line L. Alternatively, for example, in the event where the boundary line L is rendered based on the predetermined operation for the operation input unit 5 by the user, the boundary line condition setting unit 6 obtains color information about the periphery of the boundary line L concerned in the original image P1, and automatically sets a color, in which a contrast to such a peripheral color becomes large, as a color of the boundary line L.

Moreover, for example, when a desired thickness is designated based on the predetermined operation (for example, a contact operation for a predetermined icon B1 (refer to FIG. 3) displayed on the display panel 8a, and the like) for the operation input unit 5 by the user, the boundary line condition setting unit 6 sets the thickness concerned as the thickness of the boundary line L. Here, with regard to the thickness of the boundary line L, a plurality of thicknesses different from one another are defined in advance, and such thickness desired by the user may be set among the plurality of thicknesses. Alternatively, for example, in the event where the boundary line L is rendered based on the predetermined operation for the operation input unit 5 by the user, the boundary line condition setting unit 6 may automatically set the thickness of the boundary line L in consideration of a time while the position signals are continuously inputted, the time corresponding to a time from when a contact operation for the touch panel 5a at a predetermined position is started until the contact operation concerned is ended, a length of the boundary line L concerned, a position of the boundary line L in the original image P1, and the like.

Note that the thickness of the boundary line L may be changed by adjusting the detection accuracy of the contact positions by the touch panel 5a, that is, a size of a contact fictitious range to be regarded as the contact position while taking one pixel, which corresponds to the contact position of the touch panel 5a, as a center (for example, widening the contact fictitious range as the boundary line L is being thicker, and so on).

The region color setting unit 7 sets a color of a region other than a clipping target region A (refer to FIG. 4A and the like) in the original image P1.

Figure 4A:
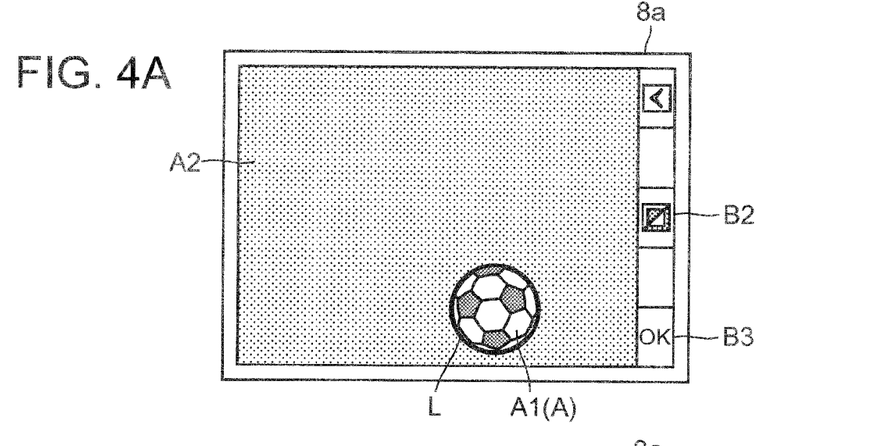
FIGS. 4A to 4C are views schematically showing examples of the images related to the image generation processing of FIG. 2.

That is to say, as second setting unit, the region color setting unit 7 sets such a color of a region other than an arbitrary region selected as the clipping target region A between a first region A1 and a second region A2 (refer to FIG. 4A and the like). In other words, the region color setting unit 7 sets at least, either one of a color of the second region A2 other than the first region A1 in the event where the first region A1 concerned is defined as the clipping target region A and the first region A1 is discriminated and displayed, and of a color of the first region A1 in the event where the second region A2 concerned is defined as the clipping target region A and the second region A2 is discriminated and displayed.

Specifically, for example, when a desired color is designated based on the predetermined operation for the operation input unit 5 by the user, the region color setting unit 7 sets the color concerned as the color of the region other than the clipping target region A. Alternatively, for example, in the event where the boundary line L is rendered based on the predetermined operation for the operation input unit 5 by the user, the region color setting unit 7 obtains the color information about the periphery of the boundary line L concerned in the original image P1, and automatically sets the color, in which the contrast to the peripheral color becomes large, as the color of the region other than the clipping target region A.

The display unit 8 includes the display panel 8a and a display control unit 8b.

The display panel (display unit) 8a displays an image (for example, the original image P1 and the like) in the display region. Moreover, as the display panel 8a, for example, a liquid crystal display panel, an organic EL display panel and the like are mentioned: however, these are merely examples, and the display panel 8a is not limited to these.

Based on image data with a predetermined size, which is read out from the image recording unit 10 and decoded by the image processing unit 9, the display control unit 8b performs control to display a predetermined image on the display screen of the display panel 8a. Specifically, the display control unit 8b includes a VRAM (Video Random Access Memory), a VRAM controller, a digital video encoder, and the like. Then, the digital video encoder reads out the luminance signals Y and the color-difference signals Cb and Cr, which are decoded by the image processing unit 9 and stored in the VRAM (not shown), from the VRAM through the VRAM controller at a predetermined playback frame rate (for example, 10 fps), and based on these data, generates a video signal and outputs the generated video signal to the display panel 8a.

Moreover, as first display control unit, the display control unit 8b displays an image, which is obtained by the image obtaining unit 9a, on the display region of the display panel 8. That is to say, as will be described later, when the image data of the original image P1 (refer to FIG. 3) desired by the user is obtained by the image obtaining unit 9a based on the predetermined operation for the operation input unit 5 by the user, the display control unit 8b obtains the image data of the original image P1 from the image obtaining unit 9a, and displays the original image P1 concerned on the display region of the display panel 8a.

Moreover, as second display control unit, the display control unit 8b displays, on the display panel 8a, at least either one of an image of the first region A1 specified in the original image P1 and an image of the second region A2 other than the first region A1 in the original image P1 concerned in a display mode capable of discriminating the at least either one.

That is to say, in image generation processing (details thereof will be described later), when the boundary line L is rendered in the original image P1 based on the predetermined operation for the operation input unit 5 by the user, the display control unit 8b exclusively switches discrimination display of the first region A1 closed by the boundary line L concerned and discrimination display of the second region A2, and displays the first region A1 and the second region A2 on the display panel 8a. Specifically, based on the predetermined operation (for example, a contact operation for a predetermined icon B2 (refer to FIG. 4A and the like) displayed on the display panel 8a, and the like) for the operation input unit 5 by the user, the display control unit 8b exclusively switches the discrimination display of the first region A1 and the discrimination display of the second region A2, and displays the first region A1 and the second region A2 on the display panel 8a.

The discrimination display of the first region A1 includes a display mode capable of discriminating the image of the first region A1 concerned from the region other than the clipping target region A. Specifically, for example, there are mentioned: a display mode (refer to FIG. 4A) in which the color of the region other than the first region A1, that is, of the region (second region A2) outside of the boundary line L is set to a predetermined color (for example, a single color); a display mode in which the region other than the boundary line L and the first region A1 is blinked; and the like. Note that, in a state of FIG. 4A, the second region A2 is displayed by the single color, and accordingly, such a display state capable of discriminating only the image of the first region A1 is established. Moreover, though not shown, in the case of blinking the region other than the boundary line L and the first region A1, it becomes possible to discriminate also the image of the second region A2, which is to be blinked, in addition to the image of the first region A1.

The discrimination display of the second region A2 includes a display mode capable of discriminating the image of the second region A2 concerned from the region other than the clipping target region A. Specifically, for example, there are mentioned: a display mode (refer to FIG. 4B) in which the color of the region other than the second region A2, that is, of the region (first region A1) inside of the boundary line L is set to a predetermined color (for example, a single color); a display mode in which the region other than the boundary line L and the second region A2 is blinked; and the like. Note that, in a state of FIG. 4B, the first region A1 is displayed by the single color, and accordingly, such a display state capable of discriminating only the image of the second region A2 is established. Moreover, though not shown, in the case of blinking the region other than the boundary line L and the second region A2, it becomes possible to discriminate also the image of the first region A1, which is to be blinked, in addition to the image of the second region A2.

As described above, by using predetermined image processing, the display control unit 8b displays, on the display panel 8a, at least either one of the image of the first region A1 and the image of the second region A2 in the display mode capable of discriminating the at least either one. In such a way, on the display panel 8a, either region between the first region A1 and the second region A2 is displayed emphatically so as to be identified as the clipping target region A.

Moreover, in the case where at least either one of the color and thickness of the boundary line L is set by the boundary line condition setting unit 6 in the event of the discrimination display of the first region A1 and the discrimination display of the second region A2, the display control unit 8b may display the boundary line L with the set color or thickness on a boundary between the first region A1 and the second region A2.

Furthermore, in the case where a color of the region other than the clipping target region A is set by the region color setting unit 7 in the event of the discrimination display of the first region A1 and the discrimination display of the second region A2, the display control unit 8b may display the first region A1 or the second region A2, which becomes the region other than the clipping target region A, by the set color.

Figure 4B:
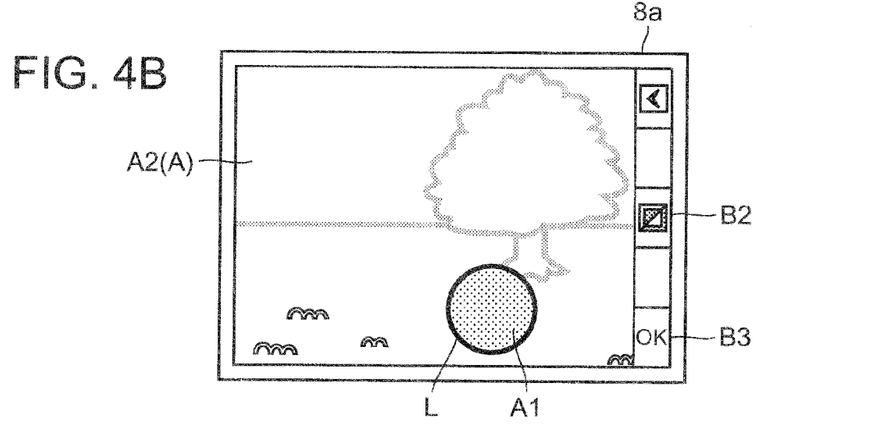

Note that, in FIG. 4A and FIG. 4B, the regions (the second region A2 in FIG. 4A, the first region A1 in FIG. 4B, and the like) other than the clipping target region A are schematically shown by being dotted.

The image processing unit 9 decodes such image data of a still image (for example, a subject existing image and the like) and a moving picture, which is related to the display target and read out from the image recording unit 10, in accordance with a predetermined encoding method (for example, a JPEG format, a motion JPEG format, an MPEG format and the like) corresponding thereto, and outputs the decoded image data to the display control unit 8b. At this time, for example, the image processing unit 9 reduces the image data, which is read out from the image recording unit 10, to a predetermined size (for example, a VGA or QVGA size) based on a display resolution of the display panel 8a, and the like, and outputs the reduced image data to the display control unit 8b.

Moreover, the image processing unit 9 includes: the image obtaining unit 9a; a region specifying unit 9b; and a clipped image generation unit 9c.

Note that, for example, the respective units of the image processing unit 9 are composed of predetermined logic circuits; however, such a configuration concerned is merely an example, and the respective units of the image processing unit 9 are not limited to this.

The image obtaining unit 9a obtains the image for use in the image generation processing.

That is to say, as obtaining unit, the image obtaining unit 9a obtains the original image P1, which is desired by the user, as a processing target image of the image generation processing. Specifically, among at least one image recorded in the image recording unit 10, the image obtaining unit 9a obtains the image data of the original image P1 (refer to FIG. 3), which is desired by the user and designated based on the predetermined operation for the operation input unit 5 by the user.

In the original image P1, the region specifying unit 9b specifies the first region A1 closed by the boundary line L corresponding to the predetermined rendering operation by the user.

That is to say, as specifying unit, the region specifying unit 9b specifies the first region A1, which is closed by the boundary line L rendered based on the predetermined operation for the operation input unit 5 by the user, in the original image P1 displayed on the display region of the display panel 8a.

Specifically, in a state where the original image P1 is displayed on the display region of the display panel 8a, upon receiving the position signals, which are related to the XY coordinates of the contact positions detected continuously by the touch panel 5a of the operation input unit 5 based on contact operations for the touch panel 5a concerned by the user, the region specifying unit 9b specifies each of the contact positions of the touch panel 5a concerned as each of operation points. Subsequently, the region specifying unit 9b connects such a plurality of the specified operation points to one another, and thereby specifies the boundary line L in the original image P1, which corresponds to the rendering operation by the user. Then, the region specifying unit 9b determines whether or not a closed region is composed in the inside of the specified boundary line L, and when it is determined that the closed region is composed as a result of this determination, the region specifying unit 9b specifies the closed region concerned as the first region A1.

At this time, for example, among upper, lower, left and right image boundaries, the region specifying unit 9b may specify a region, which is closed by at least one of the image boundaries concerned and by the boundary line L, as the first region A1.

Moreover, a plurality of the boundary lines L . . . may be rendered based on the predetermined operation for the operation input unit 5 by the user, and in this case, the region specifying unit 9b determines whether or not the number of closed regions to be formed of the plurality of boundary lines L . . . exceeds a predetermined number (for example, 100 and the like), and may be configured so as not to specify the first region A1 in the case where it is determined that the number of closed regions exceeds the predetermined number.

The clipped image generation unit 9c performs processing for clipping the region, which is selected as the clipping target region A, from the original image P1.

That is to say, as image processing unit, the clipped image generation unit 9c performs image clipping processing for clipping the arbitrary region, which is selected as the clipping target region A from between the first region A1 and the second region A2, from the original image P1. Specifically, when the clipping target region A is selected from between the first region A1 and the second region A2 based on the predetermined operation for the operation input unit 5 by the user in a state where the first region A1 and the second region A2 are displayed on the display region of the display panel 8a in the display mode capable of discriminating the first region A1 and the second region A2 from each other, the clipped image generation unit 9c performs the processing for clipping the arbitrary region (for example, the first region A1 and the like), which is selected as the clipping target region A, from the original image P1.

Here, the operation input unit 5 composes selection unit which selects the arbitrary region between the first region A1 and the second region A2 as the clipping target region A.

Note that, though the clipping target region A is selected based on the predetermined operation for the operation input unit 5 by the user, this method for selecting the clipping target region A is merely an example, and a selection method according to the present invention is not limited to this, and is changeable arbitrarily as appropriate. For example, the clipped image generation unit 9c may calculate a contrast, resolution feeling (for example, a quantity of a high frequency component) and the like of each of the first region A1 and the second region A2, and may automatically select a focused region as the clipping target region A.

In the image clipping processing, for example, the clipped image generation unit 9c generates position information (for example, an alpha map) indicating the clipping target region A (for example, the first region A1 and the like) in the original image P1. Here, the alpha map is a map that, for each of the pixels of the original image P1, represents weight as an alpha value ($0 \leq \alpha \leq 1$), the weight being in the event of performing alpha blending for the image in the clipping target region A with a predetermined background. Note that, for such a boundary portion between the first region A and the second region A2, for example, detection of the boundary may be performed by edge detection, or the detection of the boundary may be performed in consideration of the contrast, the resolution feeling (for example, the quantity of the high frequency component) and the like, or a center portion in a width (thickness) direction of the boundary line L may be detected as the boundary.

Figure 4C:
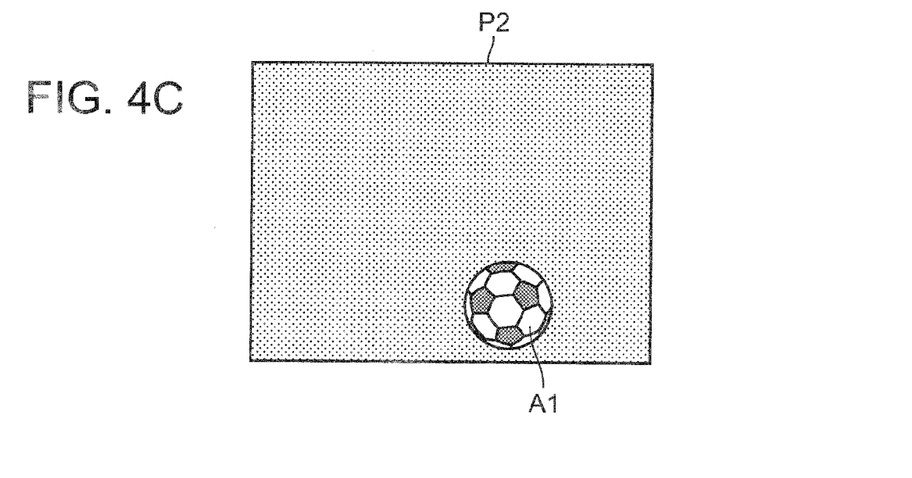

Then, based on the generated alpha map, the clipped image generation unit 9c synthesizes the image in the clipping target region A with a predetermined single color image (not shown) so that, among the respective pixels of the original image P1, pixels with an alpha value of 1 cannot be transmitted through the single color image, and pixels with an alpha value of 0 can be transmitted therethrough, and then generates a clipped image P2 (refer to FIG. 4C).

The image recording unit 10 is composed, for example, of a non-volatile memory (flash memory) and the like. Moreover, the image recording unit 10 records image data of a variety of images (for example, the clipped image P2 and the like) encoded in accordance with the predetermined encoding method by an encoding unit (not shown) of the image processing unit 9.

Specifically, as recording unit, the image recording unit 10 records the clipped image P2 of the region (for example, the first region A1 and the like) clipped as the clipping target region A between the first region A1 and the second region A2. For example, the image recording unit 10 associates the image data of the clipped image P2 with the alpha map, assigns ".jpe" as an extension of the image data of the clipped image P2 concerned, and then records the image data.

Note that, for example, the image recording unit 10 may be configured so that a recording medium (not shown) can be freely attached/detached thereto/therefrom, and may have a configuration of controlling readout of data from the attached recording medium and write of data to the recording medium.

Figure 2:
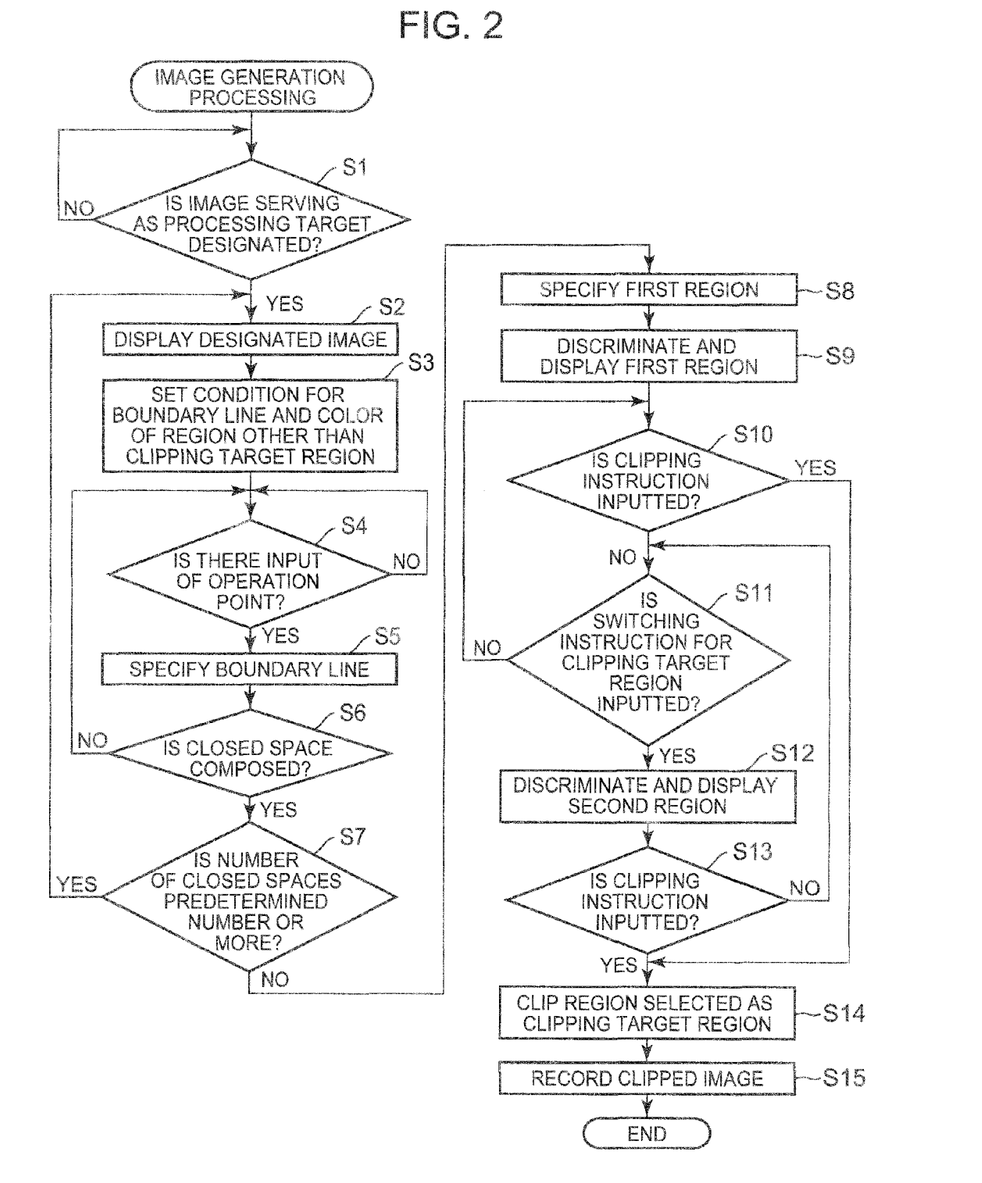
FIG. 2 is a flowchart showing an example of operations related to image generation processing by the imaging apparatus of FIG. 1.
Figure 3:
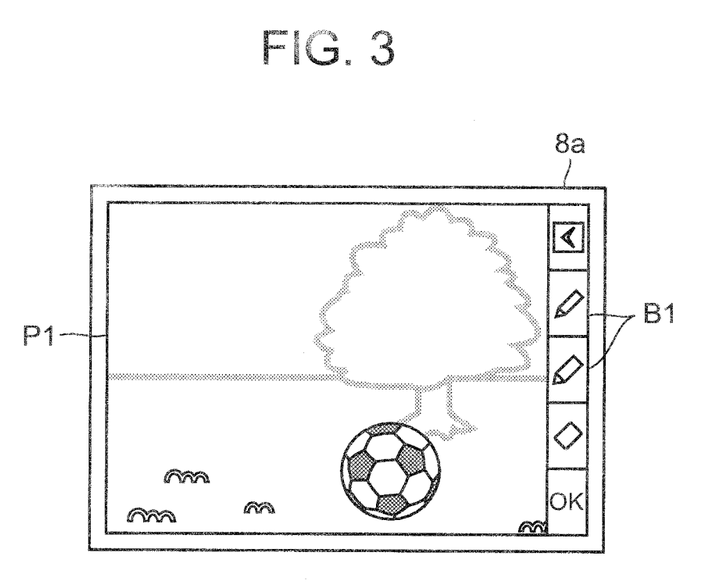
FIG. 3 is a view schematically showing an example of an image related to the image generation processing of FIG. 2.

Next, with reference to FIG. 2 to FIG. 4, a description is made of the image generation processing by the imaging apparatus 100.

FIG. 2 is a flowchart showing an example of operations related to the image generation processing.

The image generation processing, which is described below, is processing to be executed in the case where a clipped image generation mode is selected and designated from among a plurality of operation modes, which are displayed on a menu screen (not shown), based on the predetermined operation for the operation input unit 5 by the user.

<Image Generation Processing>

As shown in FIG. 2, first, the display control unit 8b displays a predetermined message, which instructs the designation of the image serving as the processing target, on the display screen of the display panel 8a, and based on the predetermined operation for the operation input unit 5 by the user, the central control unit 1 determines whether or not the image desired by the user is designated among at least one of the images displayed on the display panel 8a (Step S1).

Here, when it is determined that the image (original image P1) desired by the user is designated (Step S1; YES), then the image obtaining unit 9a of the image processing unit 9 reads out and obtains the image data of the original image P1 designated from the image recording unit 10, and the display control unit 8b displays the readout original image P1 on the display screen of the display panel 8a (Step S2).

Note that, when it is determined in Step S1 that the image is not designated (Step S1; NO), the central control unit 1 returns the processing to Step S1, and until it is determined that the image is designated (Step S1; YES), puts the processing on standby in a state where the predetermined message related to the designation of the image is displayed on the display screen of the display panel 8a.

Next, the boundary line condition setting unit 6 sets the variety of conditions for the boundary line L to be rendered, and in addition, the region color setting unit 7 sets the color of the region other than the clipping target region A (Step S3).

Specifically, for example, the display control unit 8b displays a screen, which instructs the setting of the variety of conditions for the boundary line L, on the display screen of the display panel 8a, and the boundary line condition setting unit 6 sets the desired color and thickness, which are designated based on the predetermined operation for the operation input unit 5 by the user, as the color and thickness of the boundary line L. Moreover, for example, the display control unit 8b displays a screen, which instructs the setting of the color of the region other than the clipping target region A, on the display screen of the display panel 8a, and the region color setting unit 7 sets the desired color, which is designated based on the predetermined operation for the operation input unit 5 by the user, as the color of the region other than the clipping target region A.

Note that the setting of the variety of conditions for the boundary line L and the setting of the color of the region other than the clipping target region A may be performed in the event of the rendering of the boundary line or after the rendering concerned. That is to say, the conditions for the boundary line L and the color of the region other than the clipping target region A may be preset as defaults, and at timing desired by the user, the color and thickness of the boundary line L may be set so as to become the color and the thickness, which are desired by the user, and the color of the region other than the clipping target region A may be set so as to become the color desired by the user.

Subsequently, the region specifying unit 9b determines whether or not there is an input instruction for the operation point on the display region of the display panel 8a by the user within a predetermined period (Step S4). Specifically, in response to whether or not the position signal related to the XY coordinate of the contact position, which is outputted from the touch panel 5a in such a manner that the contact of the finger (hand) of the user, the touch pen and the like with the display screen of the display panel 8a is detected by the touch panel 5a, the region specifying unit 9b determines whether or not there is an input of the operation point by the user.

When it is determined in Step S4 that there is no input of the operation point by the user (Step S4: NO), the region specifying unit 9b returns the processing to Step S4, and repeatedly executes the above-described determination processing at predetermined timing (Step S4).

Meanwhile, when it is determined in Step S4 that there is an input of the operation point by the user (Step S4: YES), the region specifying unit 9b specifies the boundary line L in the original image P1, which corresponds to the rendering operation by the user, from a plurality of the operation points (Step S5; refer to FIG. 4A). At this time, the display control unit 8b displays the boundary line L, which is specified by the region specifying unit 9b, with the color and the thickness, which are preset by the boundary line condition setting unit 6, on the display panel 8a.

Subsequently, the region specifying unit 9b determines whether or not the closed region closed by the specified boundary line L is composed (Step S6).

Here, when it is determined that the closed region is not composed (Step S6; NO), the region specifying unit 9b returns the processing to Step S4, and receives a next input instruction for the operation point on the display region of the display panel 8a.

Then, when it is determined that the closed region is composed in Step S6 (Step S6; YES), the region specifying unit 9b determines whether or not the number of closed regions is a predetermined number (for example, 100 and the like) or more (Step S7).

Here, in the image generation processing of this embodiment, a description is made on the assumption that one closed region is composed.

When it is determined that the number of closed regions is not the predetermined number or more (Step S7; NO), the region specifying unit 9b specifies the closed region as the first region A1 (Step S8). Then, the display control unit 8b performs the (discrimination) display for the image of the first region A1 on the display panel 8a in the display mode capable of discriminating the first region A1 from the region (the second region A2) other than the clipping target region A (Step S9; refer to FIG. 4A). Specifically, for example, the display control unit 8b displays the boundary line L with the color and the thickness, which are set by the boundary line condition setting unit 6, on the boundary between the first region A1 and the second region A2, and in addition, displays the second region A2 by the color set by the region color setting unit 7.

Note that, in the case where it is determined that the number of closed regions is the predetermined number or more (Step S7; YES), the CPU of the central control unit 1 returns the processing to Step S2, and the display control unit 8b displays the original image P1 on the display screen of the display panel 8a (Step S2).

Next, based on the predetermined operation (for example, a contact operation for a predetermined icon B3 (refer to FIG. 4A and the like) displayed on the display panel 8a, and the like) for the operation input unit 5 by the user, the CPU of the central control unit 1 determines whether or not a clipping instruction for the first region A1 as the clipping target region A is inputted (Step S10).

Here, a description will be made later of the case where it is determined in Step S10 that the clipping instruction is inputted (Step S10; YES).

Meanwhile, when it is determined in Step S10 that the clipping instruction is not inputted (Step S10; NO), then based on the predetermined operation (for example, a contact operation for a predetermined icon B2 (refer to FIG. 4A and the like) displayed on the display panel 8a, and the like) for the operation input unit 5 by the user, the central control unit 1 determines whether or not a switching instruction for the clipping target region A is inputted (Step S11).

Here, when it is determined that the switching instruction for the clipping target region A is not inputted (Step S11; NO), the CPU of the central control unit 1 returns the processing to Step S10, and repeatedly executes such determination processing as to whether or not the clipping instruction is inputted at predetermined timing (Step S10).

Meanwhile, when it is determined in Step S11 that the switching instruction for the clipping target region A is inputted (Step S11; YES), the display control unit 8b performs the (discrimination) display for the image of the second region A2 on the display panel 8a in the display mode capable of discriminating the second region A2 from the region (the first region A1) other than the clipping target region A (Step S12; refer to FIG. 4B). Specifically, for example, the display control unit 8b displays the boundary line L with the color and the thickness, which are set by the boundary line condition setting unit 6, on the boundary between the first region A1 and the second region A2, and in addition, displays the first region A1 by the color set by the region color setting unit 7.

Subsequently, based on the predetermined operation (for example, a contact operation for the predetermined icon B3 (refer to FIG. 4A and the like) displayed on the display panel 8a, and the like) for the operation input unit 5 by the user, the CPU of the central control unit 1 determines whether or not a clipping instruction for the second region A2 as the clipping target region A is inputted (Step S13).

Here, when it is determined that the clipping instruction is not inputted (Step S13; NO), the CPU of the central control unit 1 returns the processing to Step S11, and repeatedly executes such determination processing as to whether or not the switching instruction for the clipping target region A is inputted at predetermined timing (Step S11).

Meanwhile, when it is determined in Step S13 that the clipping instruction is inputted (Step S13; YES), or alternatively, when it is determined in Step S10 that the clipping instruction is inputted (Step S10; YES), the clipped image generation unit 9c performs the image clipping processing for clipping the region, which is selected as the clipping target region A, from the original image P1 (Step S14). In the case where an outline of an image with a large contrast ratio and so on is extracted in the vicinity of the boundary line in the event of this clipping processing, the clipping processing may be performed in accordance with this outline. Moreover, in the case where the outline is not extracted, the clipping processing is performed in the inside, outside or center of the boundary line.

That is to say, in the case where it is determined in Step S10 that the clipping instruction taking the first region A1 as the clipping target region A is inputted (Step S10; YES), the clipped image generation unit 9c performs the image clipping processing for clipping the first region A1 from the original image P1 (refer to FIG. 4C). Meanwhile, in the case where it is determined in Step S13 that the clipping instruction taking the second region A2 as the clipping target region A is inputted (Step S13; YES), the clipped image generation unit 9c performs the image clipping processing for clipping the second region A2 from the original image P1.

Note that, since detailed processing contents of the image clipping processing are mentioned above, a description thereof is omitted.

Thereafter, the image recording unit 10 records the image data of the clipped image P2 of the region (for example, the first region A1 and the like) clipped as the clipping target region A. from the original image P1 (Step S15), and the image generation processing is ended.

As described above, in accordance with the imaging apparatus 100 of this embodiment, on the display region of the display panel 8a, at least either one of the image of the first region A1 closed by the boundary line L rendered based on the predetermined operation for the operation input unit 5 by the user and the image of the second region A2 other than the first region A1 in the original image P1 is displayed in the display state capable of discriminating the at least either one. Accordingly, the user can be allowed to appropriately perform discrimination as to whether or not a region with a desired shape has been able to be designated. Then, in the image clipping processing, from between the first region A1 and the second region A2, the arbitrary region selected as the clipping target region A can be appropriately clipped from the original image P1.

Specifically, the discrimination display of the first region A1 and the discrimination display of the second region A2 are exclusively switched, and are displayed on the display region of the display panel 8*a*, and accordingly, between the first region A1 and the second region A2, the user can be allowed to appropriately grasp the region, which is being discriminated and displayed, as the clipping target region A.

As described above, in the original image P1, the discrimination of the shape of the region designated by the orbit traced by the user, such as the region to be clipped, can be performed with ease.

In other words, the user can confirm that the region selected by him/herself is correct. In particular, if the orbit of the boundary line is just displayed, then it cannot be confirmed whether or not the closed space can be correctly recognized, and accordingly, in the case of recognizing the closed space by the clipping of the image, and the like, there is also a possibility that line continuity and a gap between a line and a line cannot be correctly recognized. In accordance with the imaging apparatus 100 of this embodiment, it becomes possible to confirm such misrecognition.

Moreover, the boundary line L, in which at least either one of the color and the thickness is set, is displayed on the boundary between the first region A1 and the second region A2. Accordingly, in the case where it becomes difficult to see the boundary line L depending on contents of the original image P1, the color and thickness of the boundary line L concerned are set, whereby the user can be allowed to appropriately grasp the boundary portion between the first region A1 and the second region A2. Moreover, the boundary line L in which the color and the thickness are set as desired by the user can be rendered, and the rendering operation for closing the region, which is desired by the user, by the boundary line L concerned can be performed with more ease.

Moreover, there are set: the color of the second region A2 that becomes the region other than the clipping target region A in the event of performing the discrimination display for the first region A1; the color of the first region A1 that becomes the region other than the clipping target region A in the event of performing the discrimination display for the second region A2, and then the first region A1 concerned and the second region A2 concerned are displayed. Accordingly, in the case where it becomes difficult to see the clipping target region A depending on the contents of the original image P1, the color of the region other than the clipping target region A concerned is set, whereby the user can be allowed to appropriately grasp the clipping target region A.

Moreover, for example, based on the predetermined operation for the operation input unit 5 by the user, the arbitrary region between the first region A1 and the second region A2 is selected as the clipping target region A, whereby the selection of the clipping target region A can be appropriately performed, and the clipping of the region selected as the clipping target region A concerned can be performed as appropriate.

Furthermore, in the case where the number of closed regions closed by the boundary line L exceeds the predetermined number, the specification of the first region A1 is not performed. Accordingly, even if the imaging apparatus 100 is an apparatus that mounts thereon an arithmetic unit in which a throughput is not very high, the image generation processing can be performed efficiently.

Moreover, between the first region A1 and the second region A2, the clipped image P2 of the region clipped by the image clipping processing is recorded, and accordingly, the clipped image P2 concerned can be used for various pieces of post-processing (for example, image synthesis processing for synthesizing the clipped image P2 concerned with a background image, and the like).

Note that the present invention is not limited to the above-described embodiment, and may be subjected to varieties of improvements and design changes within the scope without departing from the spirit of the present invention.

For example, in the image generation processing of the above-described embodiment, the description has been made on the assumption that the number of closed regions is one; however, this number of closed regions is merely an example, and the number of closed regions according to the present invention is not limited to this, and is changeable arbitrarily as appropriate. That is to say, in the case of having specified a plurality of the closed regions, which are to be closed by a predetermined number of the boundary lines L rendered based on the predetermined operation for the operation input unit 5 by the user, the region specifying unit 9*b* may specify the first region A1 based on at least either one of a size of the plurality of closed regions to be closed by the predetermined number of boundary lines L and an overlapping degree between the closed regions (refer to FIG. 5A to FIG. 5D, and the like).

Note that, in FIG. 5A to FIG. 5D, the first region A1 is schematically shown by being hatched, and the region (the second region A2) other than the first region A1 concerned is schematically shown by being dotted.

Figure 5A:
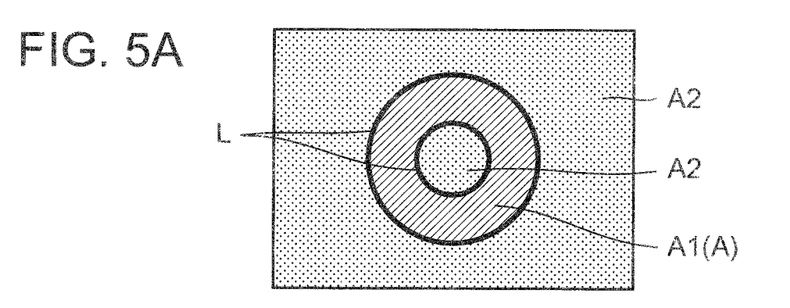
FIGS. 5A to 5D are views schematically showing examples of images related to a modification example of the image generation processing.

Specifically, for example, as shown in FIG. 5A, in the case where, between the closed regions corresponding to the plurality of boundary lines L . . . , an arbitrary closed region is present in an inside of another closed region with a larger area than the arbitrary closed region concerned, the region specifying unit 9*b* may specify an annular region, which is to be formed of these two closed regions, as the first region A1.

Figure 5B:
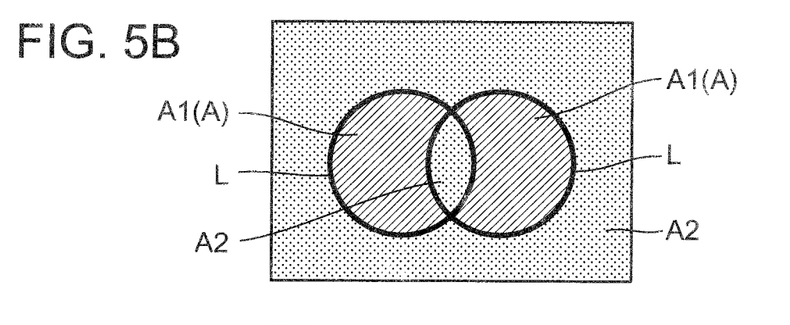
Figure 5C:
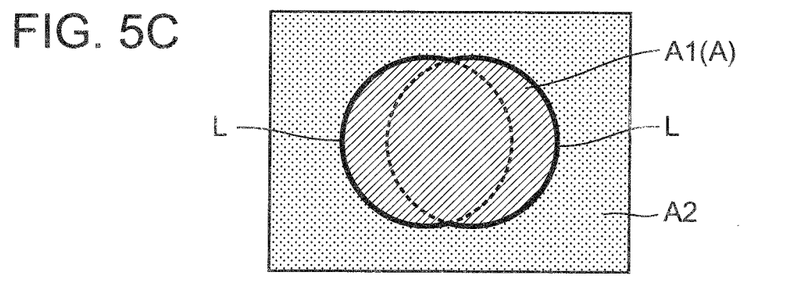
Figure 5D:
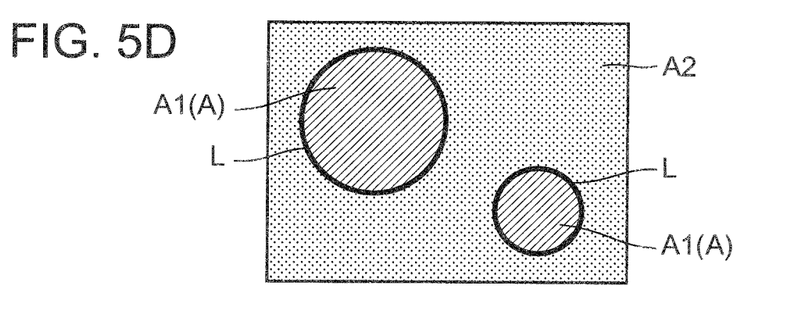

Moreover, for example, as shown in FIG. 5B and FIG. 5C, in the case where the closed regions corresponding to the plurality of boundary lines L . . . overlap each other, then by taking a size of an overlapping region thereof as a reference, the region specifying unit 9*b* determines whether to specify a region, which includes the overlapping region concerned, as the first region A1 (refer to FIG. 5C), or to specify regions, which do not include the overlapping region concerned, as the first region A1 (refer to FIG. 5B). Specifically, for example, the region specifying unit 9*b* calculates a ratio of the size (for example, the number of pixels, and the like) of the overlapping region with respect to the whole of the plurality of closed regions, and determines whether or not the overlapping region is to be included in the first region A1 in response to whether or not the ratio concerned is a predetermined threshold value or more.

Note that, in the case where the closed regions corresponding to the plurality of boundary lines L . . . do not overlap each other, the region specifying unit 9*b* may define all of the plurality of closed regions as the first region A1 (refer to FIG. 5D), or may define a predetermined number of the closed regions (for example, one closed region with a maximum area, and the like) as the first region A1.

Moreover, no matter whether or not the plurality of closed regions overlap each other, the region specifying unit 9b may be configured not to specify the first region A1 in the case where the number of closed regions has exceeded the predetermined number.

Note that, for example, the plurality of closed regions may be those individually composed of the plurality of boundary lines L, or may be those composed in such a manner that one boundary line rendered like unicursal drawing intersects an already rendered portion.

Hence, even in the case where the plurality of closed regions are specified, the first region A1 can be specified based on at least either one of the size of each of the closed regions and the overlapping degree of the closed regions, and the specification of the first region A1 or the second region A2, which serves as the clipping target region A, can be appropriately performed so as to comply with the intention of the user.

Moreover, in the above-described image generation processing, the clipped image P2, which is generated, is recorded in the image recording unit 10; however, whether or not, to record the clipped image P2 concerned is changeable arbitrarily as appropriate, and a configuration in which the clipped image P2 thus generated is simply played back and displayed may be adopted.

Moreover, in the above-described embodiment, the boundary line condition setting unit 6 is provided, and at least either one of the color and thickness of the boundary line L is set; however, whether or not to set the color and thickness of the boundary line L is changeable arbitrarily as appropriate, and it is not always necessary that the boundary line condition setting unit 6 be provided.

Moreover, in the above-described embodiment, the region color setting unit 7 is provided, and the color of the region other than the clipping target region A is set; however, whether or not to set the color of the region other than the clipping target region A is changeable arbitrary as appropriate, and it is not always necessary that the region color setting unit 7 be provided.

Furthermore, in the above-described embodiment, the closed region closed in the inside of the boundary line L is specified as the first region A1; however, this is merely an example, and the region to be specified as the first region A1 according to the present invention is not limited to this, and is changeable arbitrarily as appropriate. For example, the region, which is closed by the outside of the boundary line L and at least one image boundary among the upper, lower left and right image boundaries, may be specified as the first region A1.

Moreover, in the above-described embodiment, after the input of the rendering operation for the boundary line L by the user, the discrimination display of the first region A1 as the closed region of the boundary line L is first displayed; however, this is merely an example, and an order of the discrimination displays according to the present invention is not limited to this, the discrimination display of the second region A2 as the region other than the closed region of the boundary line L may be first performed, and it may be possible to arbitrarily set which region is to be first subjected to the discrimination display.

Moreover, the configuration of the imaging apparatus 100, which is illustrated in the above-described embodiment, is merely an example, and the configuration of the imaging apparatus 100 according to the present invention is not limited to this. Furthermore, the imaging apparatus 100 is illustrated as an image processing apparatus; however, the image processing apparatus according to the present invention is not limited to this. Moreover, the display control unit 8b, which composes both of the first display control unit and the second display control unit, is illustrated; however, the configuration of the illustrated display control unit 8b is merely an example, and the configuration of the display control unit 8b according to the present invention is not limited to this. For example, a first display control unit and a second display control unit, which compose the first display control unit and the second display control unit, respectively, may be provided independently of each other.

In addition, in the above-described embodiment, a configuration is adopted, in which functions as the obtaining unit, the first display control unit, the rendering unit, the specifying unit and the second display control unit are realized in such a manner that the image obtaining unit 9a, the operation input unit 5, the region specifying unit 9b and the display control unit 8b are driven under the control of the central control unit 1; however, such a configuration to realize these functions is not limited to this, and a configuration may be adopted, in which these unit are realized in such a manner that a predetermined program and the like are executed by the CPU of the central control unit 1.

That is to say, in a program memory (not shown) that stores programs therein, a program that includes an obtaining processing routine, a first display control processing routine, a rendering processing routine, a specifying processing routine and a second display control processing routine is stored in advance. Then, by the obtaining processing routine, the CPU of the central control unit 1 may be allowed to function as unit which obtains an image. Moreover, by the first display control processing routine, the CPU of the central control unit 1 may be allowed to function as unit which displays the obtained image on a display region of the display unit. Furthermore, by the rendering processing routine, the CPU of the central control unit 1 may be allowed to function as unit which performs the rendering in the image, which is displayed on the display region, based on a predetermined operation for operation unit by the user. Moreover, by the specifying processing routine, the CPU of the central control unit 1 may be allowed to function as unit which specifies the first region A1 closed by the rendered boundary line L. Furthermore, by the second display control processing routine, the CPU of the central control unit 1 may be allowed to function as unit which displays at least either one of the image of the specified first region A1 and the image of the second region A2 other than the first region A1 in the obtained image in the display mode capable of discriminating the at least either one.

In a similar way, such a configuration may be adopted, in which the image processing unit, the first setting unit, the second setting unit, the selection unit and the order setting unit are also realized in such a manner that a predetermined program and the like are executed by the CPU of the central control unit 1.

Moreover, as computer-readable mediums which store therein the programs for executing the above-described respective pieces of processing, it is also possible to apply a non-volatile memory such as a flash memory, and a portable recording medium such as a CD-ROM as well as a ROM, a hard disk and the like. Moreover, as a medium that provides data of the programs a predetermined communication line, a carrier wave is also applied.

While the present invention has been described with reference to the preferred embodiments, it is intended that the invention be not limited by any of the details of the description therein but includes all the embodiments which fall within the scope of the appended claims.

What is claimed is:

1. A processing method using an image processing apparatus, the method comprising:
obtaining an image;
displaying the obtained image on a display region of a display unit;
arbitrarily rendering a boundary line on the image displayed on the display region based on an operation input to an operation unit by a user;
specifying, as a first region, a portion of the display region that is enclosed by the rendered boundary line; and
displaying, on the display region and in response to the specifying of the first region, at least one of an image of the first region and an image of a second region other than the first region in the obtained image in a display mode in which display is performed so as to be capable of discriminating the at least one image;
wherein the second region shares the boundary line in common with the first region and is a remaining portion of the display region that excludes the first region;
wherein, in a case where a predetermined number of boundary lines are rendered based on the operation input to the operation unit by the user, the first region is specified based on at least one of a size of a plurality of closed regions to be closed by the predetermined number of boundary lines and an overlapping degree between the plurality of closed regions; and
wherein, in a case in which, among the plurality of closed regions, a first closed region is present inside a second closed region, an annular region formed by the first and second closed regions is specified as the first region.

2. A processing method using an image processing apparatus, the method comprising:
obtaining an image;
displaying the obtained image on a display region of a display unit;
arbitrarily rendering a boundary line on the image displayed on the display region based on an operation input to an operation unit by a user;
specifying, as a first region, a portion of the display region that is enclosed by the rendered boundary line; and
displaying, on the display region and in response to the specifying of the first region, at least one of an image of the first region and an image of a second region other than the first region in the obtained image in a display mode in which display is performed so as to be capable of discriminating the at least one image;
wherein the second region shares the boundary line in common with the first region and is a remaining portion of the display region that excludes the first region;
wherein, in a case where a predetermined number of boundary lines are rendered based on the operation input to the operation unit by the user, the first region is specified based on at least one of a size of a plurality of closed regions to be closed by the predetermined number of boundary lines and an overlapping degree between the plurality of closed regions; and
wherein, in a case in which the plurality of closed regions overlap with each other, by taking a size of an overlapping region thereof as a reference, one of a region including the overlapping region and a region not including the overlapping region is specified as the first region.

3. A processing method using an image processing apparatus, the method comprising:
obtaining an image;
displaying the obtained image on a display region of a display unit;
arbitrarily rendering a boundary line on the image displayed on the display region based on an operation input to an operation unit by a user;
specifying, as a first region, a portion of the display region that is enclosed by the rendered boundary line; and
displaying, on the display region and in response to the specifying of the first region, at least one of an image of the first region and an image of a second region other than the first region in the obtained image in a display mode in which display is performed so as to be capable of discriminating the at least one image;
wherein the second region shares the boundary line in common with the first region and is a remaining portion of the display region that excludes the first region;
wherein, in a case where a predetermined number of boundary lines are rendered based on the operation input to the operation unit by the user, the first region is specified based on at least one of a size of a plurality of closed regions to be closed by the predetermined number of boundary lines and an overlapping degree between the plurality of closed regions; and
wherein in a case in which a number of the plurality of closed regions exceeds a predetermined number, the first region is not specified.

4. The processing method according to claim 1, wherein the at least one of the image of the first region and the image of the second region is displayed on the display region in the display mode by using predetermined image processing.

5. The processing method according to claim 1, wherein the at least one of the image of the first region and the image of the second region is displayed on the display region in the display mode by emphasizing the at least one image in comparison with the other.

6. The processing method according to claim 1, further comprising:
performing processing for clipping, from the obtained image, an arbitrary region selected as a clipping target region from among the first region and the second region in a state in which the at least one image is displayed in the display mode in which the display is performed so as to be capable of discriminating the at least one image.

7. The processing method according to claim 6, wherein an image of the region selected as the clipping target region from among the first region and the second region is displayed in the display mode.

8. The processing method according to claim 1, wherein the image of the first region and the image of the second region are exclusively switched, and the switched image of the first region and the image of the second region is emphatically discriminated and displayed on the display region.

9. The processing method according to claim 1, further comprising:
setting at least one of a color and a thickness of the boundary line,
wherein the boundary line, of which at least one of the color and the thickness is set, is displayed on a boundary between the first region and the second region.

10. The processing method according to claim 1, further comprising:
setting a color of a region other than an arbitrary region selected as a clipping target region from among the first region and the second region,
wherein the region other than the clipping target region is displayed in the set color.

11. The processing method according to claim 6, further comprising:
   selecting the arbitrary region from among the first region and the second region as the clipping target region,
   wherein the processing for clipping, from the obtained image, is performed with the arbitrary region selected as the clipping target region.

12. The processing method according to claim 6, further comprising:
   recording a clipped image of the region clipped from among the first region and the second region.

13. The processing method according to claim 1, further comprising:
   setting one of the first region and the second region to be displayed first in the display mode, after the boundary line is rendered on the image displayed on the display region based on the operation input to the operation unit by the user.

\* \* \* \* \*